(12) United States Patent
Sugimoto et al.

(10) Patent No.: US 12,151,684 B2
(45) Date of Patent: Nov. 26, 2024

(54) CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventors: Sota Sugimoto, Tokyo-to (JP); Jumpei Kiriki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 18/160,648

(22) Filed: Jan. 27, 2023

(65) Prior Publication Data

US 2023/0249686 A1     Aug. 10, 2023

(30) Foreign Application Priority Data

Feb. 4, 2022  (JP) .................. 2022-016613

(51) Int. Cl.
*B60W 40/02*     (2006.01)
*B60W 30/18*     (2012.01)
*B60W 40/08*     (2012.01)
*B60W 50/00*     (2006.01)
*B60W 50/14*     (2020.01)

(52) U.S. Cl.
CPC .......... *B60W 30/181* (2013.01); *B60W 40/02* (2013.01); *B60W 40/08* (2013.01); *B60W 50/0098* (2013.01); *B60W 50/14* (2013.01); *B60W 2420/00* (2013.01); *B60W 2540/00* (2013.01); *B60W 2554/00* (2020.02)

(58) Field of Classification Search
CPC .... B60W 30/181; B60W 40/02; B60W 40/08; B60W 50/0098; B60W 50/14; B60W 2554/00; B60W 2420/00; B60W 2540/00
See application file for complete search history.

(56) References Cited

U.S. PATENT DOCUMENTS

| | | | | |
|---|---|---|---|---|
| 2020/0070824 A1* | 3/2020 | Sugano | ................ | B60W 10/20 |
| 2021/0229702 A1* | 7/2021 | Tsuji | ................ | B60W 60/0016 |
| 2021/0276569 A1* | 9/2021 | Yoshida | ................ | G06V 40/20 |

FOREIGN PATENT DOCUMENTS

| | | |
|---|---|---|
| JP | 2008-037218 A | 2/2008 |
| JP | 2009-163434 A | 7/2009 |
| JP | 2021-115973 A | 8/2021 |

* cited by examiner

*Primary Examiner* — Jacob M Amick
(74) *Attorney, Agent, or Firm* — Sughrue Mion, PLLC (57) ABSTRACT

A vehicle controller includes a processor configured to detect an abnormal condition of a driver of a vehicle, based on an inside sensor signal, search a predetermined section from the position of the vehicle at detection of the driver's abnormal condition for a first evacuation space by referring to map information, detect an obstacle in the first evacuation space, based on an outside sensor signal, search the predetermined section for a second evacuation space by referring to the map information when the obstacle is detected, control the vehicle to stop the vehicle in the second evacuation space when the second evacuation space is detected, and control the vehicle to stop the vehicle on a roadway being traveled by the vehicle in the predetermined section when the second evacuation space is not detected.

5 Claims, 5 Drawing Sheets

CONTROLLER, METHOD, AND COMPUTER PROGRAM FOR VEHICLE CONTROL

FIELD

The present invention relates to a controller, a method, and a computer program for controlling travel of a vehicle.

BACKGROUND

Techniques to cause an emergency stop of a vehicle upon detecting that it has become difficult for a driver to keep driving the vehicle have been researched (see Japanese Unexamined Patent Publications JP2009-163434A and JP2008-37218A).

An emergency evacuation system disclosed in JP2009-163434A detects a decrease in the consciousness level of a driver to evacuate a host vehicle off the road on which it is travelling. When it is determined that the consciousness level of a driver has decreased to a predetermined level or lower, the system determines whether there is an intersection within a predetermined distance ahead of the host vehicle. When there is an intersection within a predetermined distance ahead, the system determines whether the vehicle can pass the intersection. When the vehicle can pass the intersection, the system stops the host vehicle at a target stop position that is set in the intersection; when the vehicle cannot pass the intersection, the system sets a target stop position closer to the vehicle than the intersection. When there is not an intersection, the system evacuates the host vehicle to a road shoulder.

A vehicle controller disclosed in JP2008-37218A controls a host vehicle to move the vehicle toward an edge of a road being traveled and to stop the vehicle on the road edge, based on map information and information on the current position of the vehicle, upon detecting a driver's emergency that requires the vehicle to make an emergency stop.

SUMMARY

In some cases, a vehicle cannot stop at a set target position for making an emergency stop, for example, because there is an obstacle at the target position.

It is an object of the present invention to provide a vehicle controller that can stop a vehicle appropriately when a driver's abnormal condition is detected.

According to an embodiment, a vehicle controller is provided. The vehicle controller includes a processor configured to: detect an abnormal condition of a driver of a vehicle, based on an inside sensor signal generated by an inside sensor provided in the interior of the vehicle, search a predetermined section from the position of the vehicle at detection of the driver's abnormal condition for a first evacuation space where the vehicle can stop without obstructing travel of another vehicle, by referring to map information, and detect an obstacle in the first evacuation space, based on an outside sensor signal generated by an outside sensor provided on the vehicle. The inside sensor signal represents the driver's condition, and the outside sensor signal represents the surroundings of the vehicle. The processor is further configured to: search the predetermined section from the position of the vehicle at detection of the driver's abnormal condition for a second evacuation space where the vehicle can stop without obstructing travel of another vehicle, by referring to the map information, when the obstacle is detected, control the vehicle to stop the vehicle in the second evacuation space when the second evacuation space is detected, and control the vehicle to stop the vehicle on a roadway being traveled by the vehicle in the predetermined section from the position of the vehicle at detection of the driver's abnormal condition when the second evacuation space is not detected.

In the vehicle controller, the processor is preferably further configured to decelerate the vehicle to a predetermined speed when the driver's abnormal condition is detected, and the processor preferably searches for the second evacuation space while the vehicle is traveling at the predetermined speed.

In the vehicle controller, the processor is preferably further configured to determine whether the type of the obstacle is a movable object or a stationary object, and set a lower limit of the distance between the first evacuation space and the second evacuation space for the case where the type of the obstacle is a movable object greater than the lower limit for the case where the type of the obstacle is a stationary object.

According to another embodiment, a method for vehicle control is provided. The method includes: detecting an abnormal condition of a driver of a vehicle, based on an inside sensor signal generated by an inside sensor provided in the interior of the vehicle; searching a predetermined section from the position of the vehicle at detection of the driver's abnormal condition for a first evacuation space where the vehicle can stop without obstructing travel of another vehicle, by referring to map information; and detecting an obstacle in the first evacuation space, based on an outside sensor signal generated by an outside sensor provided on the vehicle. The inside sensor signal represents the driver's condition, and the outside sensor signal represents the surroundings of the vehicle. The method further includes: searching the predetermined section from the position of the vehicle at detection of the driver's abnormal condition for a second evacuation space where the vehicle can stop without obstructing travel of another vehicle, by referring to the map information, when the obstacle is detected; controlling the vehicle to stop the vehicle in the second evacuation space when the second evacuation space is detected; and controlling the vehicle to stop the vehicle on a roadway being traveled by the vehicle in the predetermined section from the position of the vehicle at detection of the driver's abnormal condition when the second evacuation space is not detected.

According to still another embodiment, a non-transitory recording medium that stores a computer program for vehicle control is provided. The computer program includes instructions causing a processor mounted on a vehicle to execute a process including: detecting an abnormal condition of a driver of the vehicle, based on an inside sensor signal generated by an inside sensor provided in the interior of the vehicle; searching a predetermined section from the position of the vehicle at detection of the driver's abnormal condition for a first evacuation space where the vehicle can stop without obstructing travel of another vehicle, by referring to map information; and detecting an obstacle in the first evacuation space, based on an outside sensor signal generated by an outside sensor provided on the vehicle. The inside sensor signal represents the driver's condition, and the outside sensor signal represents the surroundings of the vehicle. The process further includes: searching the predetermined section from the position of the vehicle at detection of the driver's abnormal condition for a second evacuation space where the vehicle can stop without obstructing travel of another vehicle, by referring to the map information, when the obstacle is detected; controlling the vehicle to stop the vehicle in the second evacuation space when the second evacuation space is detected; and controlling the vehicle to stop the vehicle on a roadway being traveled by the vehicle in the predetermined section from the position of the vehicle at detection of the driver's abnormal condition when the second evacuation space is not detected.

The vehicle controller according to the present disclosure has an advantageous effect of being able to stop a vehicle appropriately when a driver's abnormal condition is detected.

DESCRIPTION OF EMBODIMENTS

A vehicle controller, a method for vehicle control executed by the vehicle controller, and a computer program for vehicle control will now be described with reference to the attached drawings. The vehicle controller has the function of an "emergency driving stop system (EDSS)," and automatically stops a vehicle upon detecting an abnormal condition such that it is difficult for a driver to keep driving the vehicle. To this end, the vehicle controller determines whether a first evacuation space where travel of another vehicle is not obstructed exists within a predetermined distance in the travel direction of the vehicle, based on map information, and stops the vehicle in the first evacuation space when such a first evacuation space exists. When such a first evacuation space does not exist, the vehicle controller stops the vehicle on the road being traveled by the vehicle (hereafter simply the "traveled road"). Even if a first evacuation space exists, when there is a certain obstacle in the first evacuation space and it is difficult to stop the vehicle there, the vehicle controller re-searches for a second evacuation space different from the first evacuation space. When a second evacuation space is found, the vehicle controller stops the vehicle in the second evacuation space. However, when no second evacuation space is found, the vehicle controller immediately stops the vehicle on the traveled road.

Figure 1:
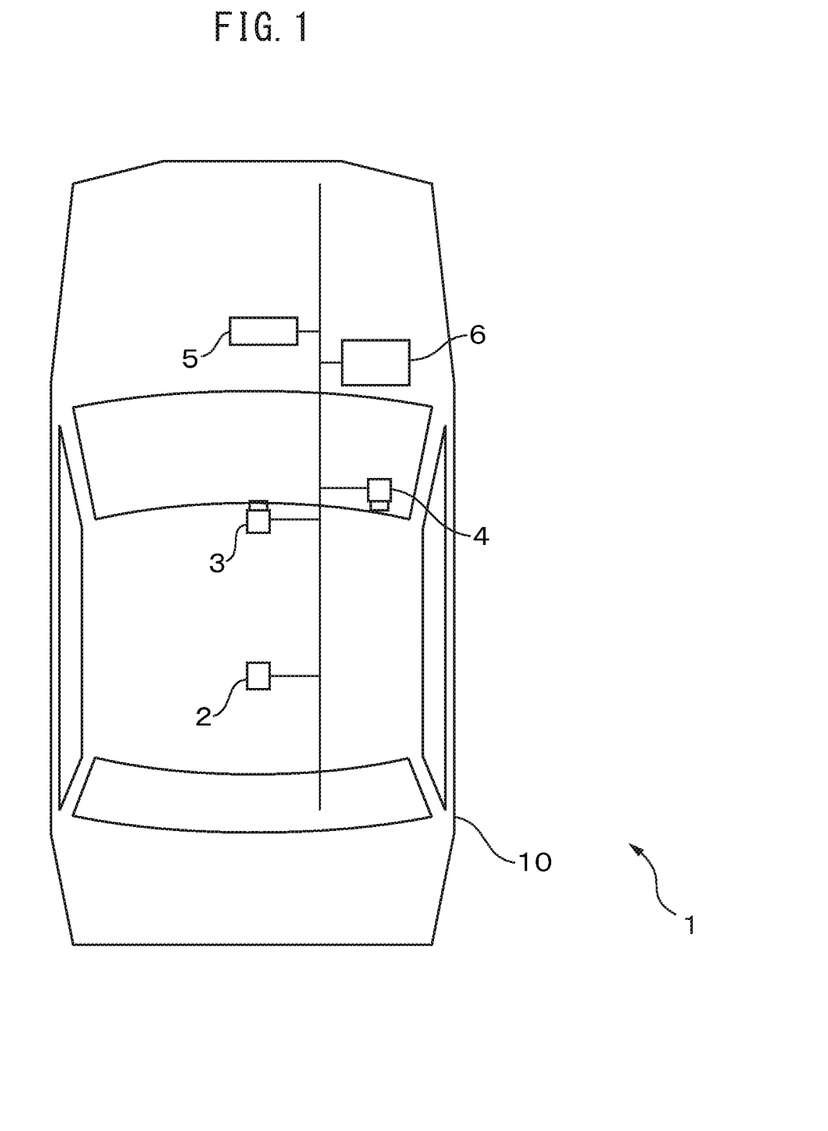
FIG. 1 schematically illustrates the configuration of a vehicle control system equipped with a vehicle controller.
Figure 2:
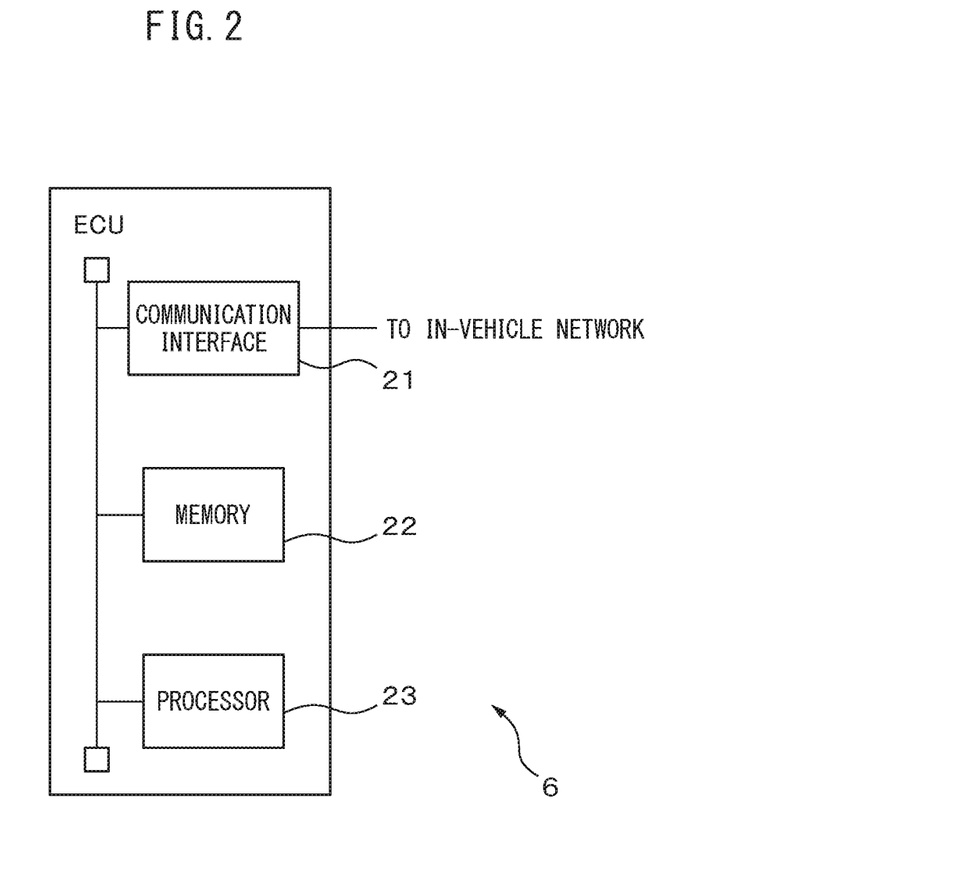
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a GPS receiver 2, a camera 3, a driver monitoring camera 4, a storage device 5, and an electronic control unit (ECU) 6, which is an example of the vehicle controller. The GPS receiver 2, the camera 3, the driver monitoring camera 4, and the storage device 5 are communicably connected to the ECU 6 via an in-vehicle network conforming to a standard such as a controller area network. The vehicle control system 1 may further include a distance sensor (not illustrated), such as LiDAR or radar, which measures the distances from the vehicle 10 to objects around the vehicle 10. The vehicle control system 1 may further include a wireless communication terminal (not illustrated) for wireless communication with another device, or a navigation device (not illustrated) for searching for a planned travel route to a destination.

The GPS receiver 2 receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 6 via the in-vehicle network at predetermined intervals. The vehicle control system 1 may include a receiver conforming to another satellite positioning system, instead of the GPS receiver 2.

The camera 3, which is an example of the outside sensor, includes a two-dimensional detector constructed from an array of optoelectronic transducers, such as CCD or C-MOS, having sensitivity to visible light and a focusing optical system that forms an image of a target region of capturing on the two-dimensional detector. The camera 3 is mounted, for example, in the interior of the vehicle 10 so as to be oriented, for example, to the front of the vehicle 10. The camera 3 takes a picture of a region in front of the vehicle 10 every predetermined capturing period (e.g., 1/30 to 1/10 seconds), and generates images representing the region. Each image obtained by the camera 3 is an example of the outside sensor signal representing the surroundings of the vehicle. The images obtained by the camera 3 may be color or grayscale images. The vehicle 10 may include multiple cameras taking pictures in different orientations or having different focal lengths. For example, the vehicle 10 may include a camera oriented to the rear of the vehicle.

Whenever an image is generated, the camera 3 outputs the generated image to the ECU 6 via the in-vehicle network.

The driver monitoring camera 4, which is an example of the inside sensor, includes a two-dimensional detector constructed from an array of optoelectronic transducers, such as CCD or C-MOS, having sensitivity to visible or infrared light and a focusing optical system that forms an image of a target region of capturing on the two-dimensional detector. The driver monitoring camera 4 may further include a light source, such as an infrared LED, for illuminating the driver. The driver monitoring camera 4 is mounted, for example, on or near an instrument panel and oriented to the driver so that the head of the driver sitting on the driver's seat of the vehicle 10 may be included in the target region of capturing, i.e., so that pictures of the driver's head can be taken. The driver monitoring camera 4 takes a picture of the driver's head every predetermined capturing period (e.g., 1/30 to 1/10 seconds) and generates images representing the driver's head (hereafter referred to as "head images" for convenience of description to distinguish them from images obtained by the camera 3). Each head image obtained by the driver monitoring camera 4 is an example of the inside sensor signal. The head images may be color or grayscale images. Whenever a head image is generated, the driver monitoring camera 4 outputs the generated head image to the ECU 6 via the in-vehicle network.

The storage device 5, which is an example of a storage unit, includes, for example, a hard disk drive or a nonvolatile semiconductor memory. The storage device 5 stores a high-precision map used in autonomous driving control of the vehicle. The high-precision map includes, for example, information indicating road markings, such as lane-dividing lines or stop lines, and signposts for each road included in a predetermined region represented in this map. The high-precision map is an example of the map information.

The storage device 5 may further include a processor for executing, for example, a process to update the high-precision map and a process related to a request from the ECU 6 to read out the high-precision map. For example, whenever the vehicle 10 moves a predetermined distance, the storage device 5 may transmit a request to obtain a high-precision map, together with the current position of the vehicle 10, to a map server via a wireless communication terminal (not illustrated). The storage device 5 may receive a high-precision map of a predetermined region around the current position of the vehicle 10 from the map server via the wireless communication terminal. When a request from the ECU 6 to read out the high-precision map is received, the storage device 5 cuts out that portion of the high-precision map stored therein which includes the current position of the vehicle 10 and which represents a region smaller than the predetermined region, and outputs the cut portion to the ECU 6 via the in-vehicle network.

The ECU 6 assists the driver in driving the vehicle 10. In the present embodiment, when the driver is in an abnormal condition such that he/she cannot keep driving the vehicle 10, the ECU 6 detects the abnormal condition, based on head images. When the driver's abnormal condition is detected, the ECU 6 controls the vehicle 10 to activate the EDSS function to make an emergency stop of the vehicle 10.

As illustrated in FIG. 2, the ECU 6 includes a communication interface 21, a memory 22, and a processor 23. The communication interface 21, the memory 22 and the processor 23 may be configured as separate circuits or a single integrated circuit.

The communication interface 21 includes an interface circuit for connecting the ECU 6 to the in-vehicle network. Whenever positioning information is received from the GPS receiver 2, the communication interface 21 passes the positioning information to the processor 23. Whenever an image is received from the camera 3, the communication interface 21 passes the received image to the processor 23. Similarly, whenever a head image is received from the driver monitoring camera 4, the communication interface 21 passes the received head image to the processor 23. In addition, the communication interface 21 passes the high-precision map read from the storage device 5 to the processor 23.

The memory 22, which is another example of a storage unit, includes, for example, volatile and nonvolatile semiconductor memories, and stores various algorithms and various types of data used in a vehicle control process executed by the processor 23 of the ECU 6. For example, the memory 22 stores parameters of the camera 3 such as the mounted position, the imaging direction, and the focal length of the camera 3. The memory 22 further stores various parameters for defining a classifier for object detection used for detecting an obstacle or other objects; various parameters used for detecting portions of the driver's face from a head image and for determining the orientation of the face and the driver's sleepiness level therefrom; and other parameters. In addition, the memory 22 temporarily stores images of the surroundings of the vehicle 10, head images, positioning information, a high-precision map, and various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
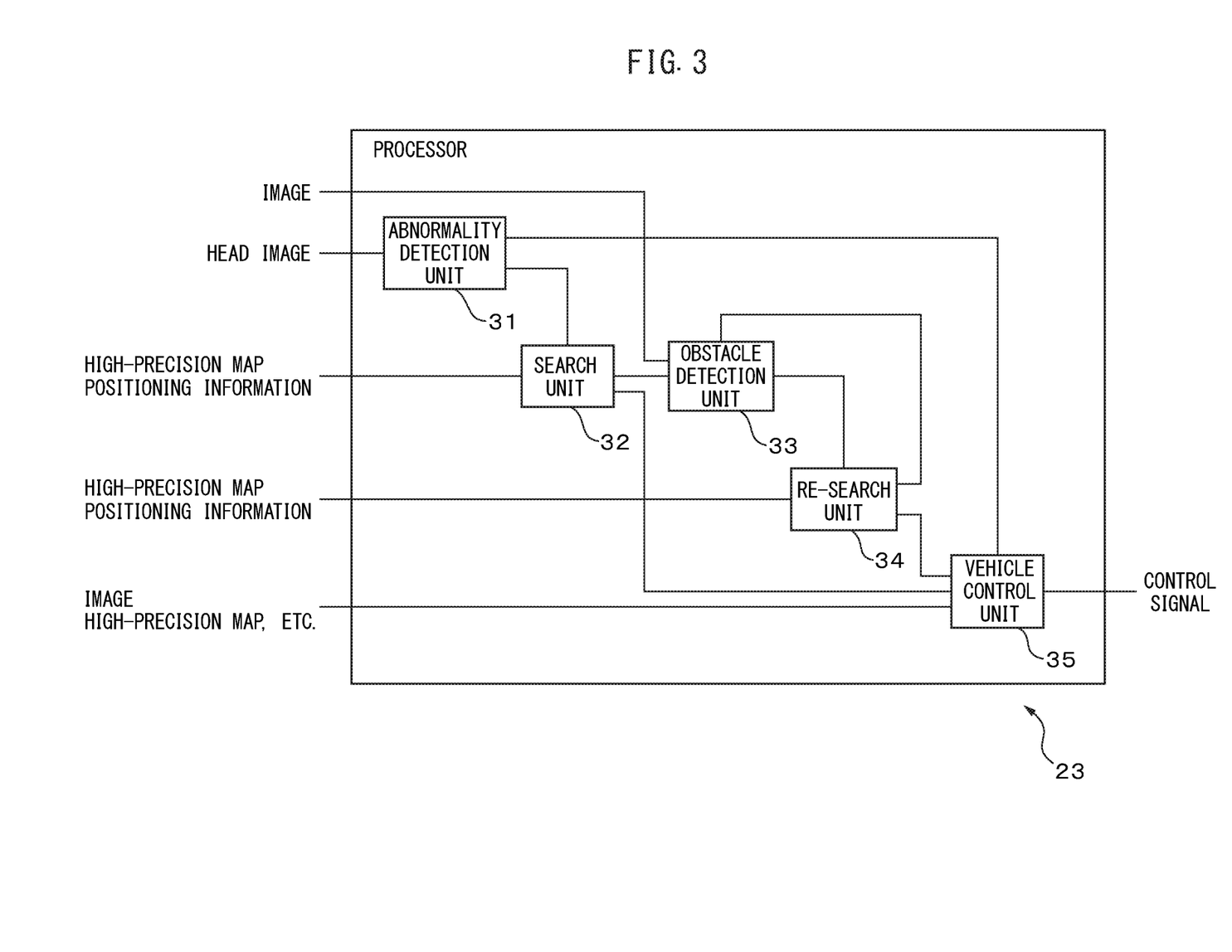
FIG. 3 is a functional block diagram of a processor of the electronic control unit, related to a vehicle control process.

FIG. 3 is a functional block diagram of the processor 23, related to the vehicle control process. The processor 23 includes an abnormality detection unit 31, a search unit 32, an obstacle detection unit 33, a re-search unit 34, and a vehicle control unit 35. These units included in the processor 23 are functional modules, for example, implemented by a computer program executed by the processor 23, or may be dedicated operating circuits provided in the processor 23.

When the driver is in an abnormal condition such that he/she cannot keep driving the vehicle 10, the abnormality detection unit 31 detects the abnormal condition, based on head images. In the following, the fact that the driver is in an abnormal condition such that he/she cannot keep driving the vehicle 10 will be referred to simply as "the driver is in an abnormal condition," for convenience of description. For example, the abnormality detection unit 31 determines the driver's sleepiness level, based on a series of head images obtained in a preceding certain period, at predetermined intervals. When the driver's sleepiness level is such that he/she cannot watch ahead of the vehicle 10, the abnormality detection unit 31 determines that the driver is in an abnormal condition such that he/she cannot keep driving the vehicle 10. To achieve this, the abnormality detection unit 31 detects the driver's looking direction and the degrees of opening of the eyes and the mouth (hereafter referred to as the "eye-opening level" and the "mouth-opening level," respectively) of the driver from each of a series of head images obtained in a preceding certain period. The abnormality detection unit 31 then determines the driver's sleepiness level, based on the detected looking direction, eye-opening level, and mouth-opening level.

In this case, the abnormality detection unit 31 detects a region representing the driver's face (hereafter a "face region") in each head image, for example, by inputting the head image into a classifier that has been trained to detect a driver's face from an image. As such a classifier, the abnormality detection unit 31 can use, for example, a deep neural network (DNN) having architecture of a convolutional neural network (CNN) type, e.g., Single Shot Multi-Box Detector (SSD) or Faster R-CNN. Alternatively, the abnormality detection unit 31 can use a DNN having architecture of a self-attention network (SAN) type, such as a Vision transformer. Alternatively, the abnormality detection unit 31 may use a classifier based on another machine learning technique, such as an AdaBoost classifier, as such a classifier. Such a classifier is trained in advance in accordance with a predetermined training technique, such as backpropagation, with a large number of training images representing human faces. The abnormality detection unit 31 detects the driver's eyes and mouth from the face region of each head image. To this end, the abnormality detection unit 31 applies, for example, an edge detection filter, such as a Sobel filter, to detect edge pixels in the face region. The abnormality detection unit 31 then detects lines of edge pixels extending in a substantially horizontal direction, and detects, for each of the left and right eyes, such two lines vertically spaced in an area of the face region where the eye is supposed to lie, as the upper and lower eyelids of the eye. Similarly, the abnormality detection unit 31 detects a sub-area defined by such two lines vertically spaced in an area of the face region where the mouth is supposed to lie, as the driver's mouth. The abnormality detection unit 31 may detect the upper and lower eyelids of the driver's left and right eyes from a head image in accordance with another technique to detect eyelids from an image. Similarly, the abnormality detection unit 31 may detect the driver's mouth from a head image in accordance with another technique to detect a mouth from an image.

For each head image, the abnormality detection unit 31 estimates the driver's eye-opening level, based on the distances between the upper and lower eyelids of the left and right eyes. For example, the abnormality detection unit 31 uses the average of the distances between the upper and lower eyelids of the left and right eyes as the eye-opening level. The abnormality detection unit 31 may estimate the eye-opening level in accordance with another technique to calculate the level from upper and lower eyelids in an image. The abnormality detection unit 31 then calculates the interval between maxima of the eye-opening level from time-varying changes in the eye-opening level in the series of head images as the duration of the driver's single blink. The abnormality detection unit 31 then counts the number of blinks in the preceding certain period, and calculates the average of intervals between the blinks as the period of blinks. The abnormality detection unit 31 further calculates, for example, the ratio of the vertical length of the mouth to the horizontal length thereof for each head image in the preceding certain period, and calculates the average of the ratios as the driver's mouth-opening level. The abnormality detection unit 31 may calculate the driver's mouth-opening level in accordance with another technique to calculate the level from an area representing a mouth in an image.

The abnormality detection unit 31 further detects the driver's looking direction from each head image. For example, for at least one of the driver's left and right eyes represented in each head image, the abnormality detection unit 31 detects a corneal reflection image of a light source and the centroid of the pupil (hereafter simply the "pupillary centroid") from the area defined by the upper and lower eyelids (hereafter the "eye area"). A corneal reflection image of a light source is also referred to as a Purkinje image. Specifically, the abnormality detection unit 31 detects a Purkinje image, for example, by template matching of the eye area with templates of a Purkinje image. Similarly, the abnormality detection unit 31 detects the pupil by template matching of the eye area with templates of a pupil, and determines the centroid of the area representing the detected pupil as the pupillary centroid. The abnormality detection unit 31 may detect a Purkinje image and the pupillary centroid in accordance with another technique to detect them from an eye area. The abnormality detection unit 31 then calculates the distance between the Purkinje image and the pupillary centroid, and refers to a table representing the relationship between this distance and a driver's looking direction to detect the driver's looking direction. Such a table may be prestored in the memory 22. The abnormality detection unit 31 then determines the amount of change in the looking direction for each pair of successive head images in the preceding certain period, and calculates the rate of change in the looking direction by dividing the average of the amounts of change by the interval of acquisition of the head images.

The abnormality detection unit 31 determines the driver's sleepiness level, based on at least one of the period and frequency of blinks, the mouth-opening level, and the rate of change in the looking direction. When the sleepiness level is such that the driver cannot watch ahead of the vehicle 10, the abnormality detection unit 31 determines that the driver is in an abnormal condition. For example, the abnormality detection unit 31 determines that the driver is in an abnormal condition, in the case where the number of blinks in the preceding certain period is greater than a predetermined number, the period of blinks is longer than a predetermined time threshold, and the mouth-opening level is higher than a predetermined opening level.

The abnormality detection unit 31 may determine whether the driver is in an abnormal condition, based on another index indicating the driver's state. For example, when the driver's face or eyes have not been detected from the head images for a predetermined period, the abnormality detection unit 31 may determine that the driver is in an abnormal condition. Alternatively, when the driver's eyes have been closed for a predetermined period, the abnormality detection unit 31 may determine that the driver is in an abnormal condition. In this case, when the eye-opening level is lower than an eye-closing determining threshold corresponding to closed eyes, the abnormality detection unit 31 determines that the driver's eyes are closed. In the case where a microphone (not illustrated) is provided in the interior of the vehicle, the abnormality detection unit 31 may detect a particular unusual sound made by the driver (e.g., a snoring sound) from a voice signal generated by the microphone and representing a voice in the vehicle interior. The abnormality detection unit 31 may then determine that the driver is in an abnormal condition, when a particular unusual sound made by the driver is detected. The abnormality detection unit 31 detects the unusual sound made by the driver in accordance with a certain technique to detect a particular unusual sound from a voice signal. The microphone is another example of the inside sensor. The voice signal generated by the microphone is another example of the inside sensor signal.

When it is determined that the driver is in an abnormal condition, the abnormality detection unit 31 instructs the vehicle control unit 35 to activate the EDSS function and notifies the search unit 32 of the result of determination. When it is determined that the driver is not in an abnormal condition, the abnormality detection unit 31 may omit to activate the EDSS function.

When notified that the driver's abnormal condition is detected, the search unit 32 searches a predetermined section from the position of the vehicle 10 at detection of the abnormal condition for a first evacuation space where the vehicle 10 can stop without obstructing travel of another vehicle, by referring to the high-precision map. The position of the vehicle 10 at detection of the driver's abnormal condition will hereafter be referred to as the "abnormality detection point." The predetermined section from the position of the vehicle 10 at detection of the abnormal condition may be referred to as the "search section."

The search unit 32 estimates the position of the vehicle 10 indicated by the latest positioning information at detection of the driver's abnormal condition as the abnormality detection point. The search unit 32 then identifies a section of a predetermined traveled distance (e.g., several hundred meters to approximately one kilometer) in the travel direction of the vehicle 10 from the abnormality detection point as the search section of a first evacuation space. Alternatively, the search unit 32 may identify a section from the abnormality detection point to a location that can be reached by the vehicle 10 that has traveled for a predetermined travel time (e.g., several dozen seconds to approximately two minutes) since the detection of the driver's abnormal condition, as the search section of a first evacuation space. To this end, the search unit 32 identifies the search section, assuming that the vehicle 10 will travel for the predetermined travel time at the current speed of the vehicle 10 measured by a vehicle speed sensor (not illustrated)

mounted on the vehicle 10. Alternatively, the search unit 32 may identify the search section, assuming that the vehicle 10 will decelerate to a preset predetermined low speed and travel at the low speed for the predetermined travel time after the deceleration. The low speed is set so as to prevent danger that the vehicle 10 causes an accident before stopping (e.g., at 10 km/h).

The search unit 32 searches the identified search section for a space where the vehicle 10 can stop without obstructing travel of another vehicle as a candidate space, by referring to the high-precision map. The space where the vehicle 10 can stop without obstructing travel of another vehicle may be a space outside a roadway and larger than the vehicle 10, such as a road shoulder or a parking space. Of such candidate spaces, the search unit 32 determines a candidate space closest to the vehicle 10 and separated from the abnormality detection point by the shortest distance that the vehicle 10 can reach or more as the first evacuation space. More specifically, the shortest distance that the vehicle 10 can reach (hereafter the "shortest reachable distance") is set greater as the number of lane changes required for the vehicle 10 to move from the lane on which the vehicle 10 is traveling (hereafter the "current lane") to the candidate space increases. For example, the search unit 32 calculates the shortest reachable distance by multiplying a preset distance required for a lane change by the number of lane changes required for the vehicle 10 to move from the current lane to the candidate space. The distance required for a lane change is prestored in the memory 22. The search unit 32 identifies the current lane by referring to the position of the vehicle 10 indicated by the latest positioning information and the high-precision map.

Alternatively, the search unit 32 may identify the current lane by comparing features represented in an image obtained by the camera 3, such as lane-dividing lines, with corresponding features represented in the high-precision map. In this case, the search unit 32 detects a feature represented in the latest image by inputting the image into a classifier that has been trained to detect a detection target feature. As such a classifier, the search unit 32 can use a DNN having architecture of a CNN or SAN type. Alternatively, the search unit 32 may use a classifier based on another machine learning technique, such as an AdaBoost classifier. Such a classifier is trained in advance in accordance with a predetermined training technique, such as backpropagation, so as to detect a detection target feature from an image. The classifier outputs information for identifying an object region including a feature detected in the inputted image.

Upon detecting features from the image, the search unit 32 projects the features detected from the image onto the high-precision map or features around the vehicle 10 represented in the high-precision map onto the image, with an assumption about the position and orientation of the vehicle 10. The search unit 32 then calculates the degree of matching, based on the difference between the positions of corresponding features. While changing the assumed position and orientation of the vehicle 10, the search unit 32 repeats calculation of the degree of matching between corresponding features. The search unit 32 then estimates the actual position and orientation of the vehicle 10 to be the position and orientation thereof for the case where the features detected from the image match the corresponding features represented in the high-precision map the best. The search unit 32 determines the lane including the identified actual position of the vehicle 10 as the current lane, by referring to the high-precision map.

Upon identifying the current lane, the search unit 32 counts, for each candidate space, the number of lanes between the current lane and the candidate space by referring to the high-precision map. The search unit 32 then determines the number obtained by adding one to the number of lanes between the current lane and the candidate space as the number of necessary lane changes for the candidate space.

When a first evacuation space is detected, the search unit 32 notifies the obstacle detection unit 33, the re-search unit 34, and the vehicle control unit 35 of information indicating the position of the first evacuation space and information indicating the abnormality detection point. When no first evacuation space is found, the search unit 32 notifies the vehicle control unit 35 that no first evacuation space is found.

When a first evacuation space is detected, the obstacle detection unit 33 detects an obstacle in the first evacuation space, based on each of time-series images generated thereafter by the camera 3. The following describes a process on a single image because the obstacle detection unit 33 executes the same process on each image.

The obstacle detection unit 33 identifies the position and orientation of the vehicle 10 by comparing features represented in an image obtained by the camera 3 with corresponding features represented in the high-precision map, as described in relation to detection of the current lane by the search unit 32. In the case where the search unit 32 identifies the position and orientation of the vehicle 10, the obstacle detection unit 33 may obtain information indicating the position and orientation of the vehicle 10 from the search unit 32. The obstacle detection unit 33 further identifies the region in the image corresponding to the first evacuation space (hereafter the "evacuation region"), based on the position and orientation of the vehicle 10, the position of the first evacuation space, and parameters of the camera 3 such as the imaging direction, the mounted position, and the focal length of the camera 3. The obstacle detection unit 33 then determines whether there is a certain three-dimensional structure in the evacuation region of the image. The three-dimensional structure is, for example, a human, a motorcycle, a vehicle, a signboard, a block, a pole, or a pylon. The obstacle detection unit 33 uses a classifier that is configured similarly to the classifier described in relation to detection of features by the search unit 32 and that has been trained to detect a three-dimensional structure and to determine the type of the structure. The obstacle detection unit 33 inputs the image into such a classifier to detect an object region representing such a three-dimensional structure in the image. The classifier further outputs the type of the three-dimensional structure. As the type of the three-dimensional structure, the classifier may output a movable object or a stationary object. When the object region representing the three-dimensional structure is included in the evacuation region, the obstacle detection unit 33 estimates the distance from the vehicle 10 to the structure. When the difference between the distance from the vehicle 10 to the structure and the distance from the vehicle 10 to the first evacuation space is within a predetermined error range, the obstacle detection unit 33 determines that the structure is an obstacle in the first evacuation space.

When the obstacle is on the road surface, the bottom position of the object region representing the obstacle in the image corresponds one-to-one to the direction to the bottom of the obstacle viewed from the camera 3. Additionally, the imaging direction and the mounted position of the camera 3 are known. Thus the obstacle detection unit 33 can estimate the distance from the vehicle 10 to the obstacle, based on the height of the mounted position of the camera 3 from the road surface and that direction from the camera 3 to the bottom of the obstacle which corresponds to the bottom position of the object region representing the obstacle in the image. Alternatively, in the case where the vehicle 10 is equipped with a range sensor (not illustrated), the obstacle detection unit 33 may estimate the distance to the obstacle, based on a ranging signal obtained from the range sensor. In this case, the obstacle detection unit 33 determines a measured value indicated by the ranging signal, i.e., the value of the distance to an object in the direction corresponding to the position of the object region representing the obstacle in the image, as the distance from the vehicle 10 to the obstacle.

The obstacle detection unit 33 executes the above-described process on the latest image at predetermined intervals until an obstacle is detected in the first evacuation space or until the vehicle 10 reaches the first evacuation space. When an obstacle is detected in the first evacuation space, the obstacle detection unit 33 notifies this fact to the re-search unit 34 and the vehicle control unit 35.

When a second evacuation space is detected by the re-search unit 34, the obstacle detection unit 33 may further detect an obstacle in the second evacuation space by executing a process similar to that described above. When an obstacle is detected in the second evacuation space, the obstacle detection unit 33 notifies this fact to the re-search unit 34 and the vehicle control unit 35.

When notified by the obstacle detection unit 33 that an obstacle is detected in the first evacuation space, the re-search unit 34 searches the search section from the abnormality detection point for a second evacuation space, by referring to the high-precision map. To this end, the re-search unit 34 searches for one or more candidate spaces by a process similar to that executed by the search unit 32. When one or more candidate spaces are found, the re-search unit 34 detects, of the candidate spaces, a candidate space closest to the vehicle 10 and separated from the current position of the vehicle 10 by the shortest reachable distance or more as the second evacuation space, similarly to the search unit 32.

When a second evacuation space is detected, the re-search unit 34 notifies the obstacle detection unit 33 and the vehicle control unit 35 that a second evacuation space is detected and the position of the detected second evacuation space. When no second evacuation space is detected, the re-search unit 34 notifies the vehicle control unit 35 that no second evacuation space is found.

When notified by the obstacle detection unit 33 that there is an obstacle in the detected second evacuation space, the re-search unit 34 may further re-search a second evacuation space by executing a process similar to that described above. The re-search unit 34 may then notify the obstacle detection unit 33 and the vehicle control unit 35 of the position of the detected second evacuation space as the result of re-search. In this way, the re-search unit 34 may repeatedly search for a second evacuation space by executing a process similar to that described above until a second evacuation space without an obstacle is found.

When notified that the driver's abnormal condition is detected, the vehicle control unit 35 activates the EDSS function. More specifically, when notified that the driver's abnormal condition is detected, the vehicle control unit 35 decelerates the vehicle 10 to a predetermined low speed, and thereafter controls the vehicle 10 to stop at a target stopping position.

In the present embodiment, when a first evacuation space is detected and no obstacle is detected in the first evacuation space, the vehicle control unit 35 sets the target stopping position at the first evacuation space. When a second evacuation space is detected, the vehicle control unit 35 sets the target stopping position at the second evacuation space. When neither evacuation space is detected or an obstacle is detected in every detected evacuation space, the vehicle control unit 35 sets the target stopping position on the roadway being traveled by the vehicle 10, e.g., on the current lane so as to immediately stop the vehicle 10 at a predetermined deceleration. When the current lane is a passing lane, the vehicle control unit 35 may set the target stopping position on a travel lane. In other words, when neither first nor second evacuation space is detected or an obstacle is detected in every detected evacuation space, the vehicle control unit 35 stops the vehicle 10 even in the middle of the search section. The vehicle control unit 35 controls the vehicle 10 to stop the vehicle 10 at the target stopping position.

To achieve this, the vehicle control unit 35 generates a planned trajectory of the vehicle 10 from the current position of the vehicle 10 to the target stopping position. The planned trajectory is represented, for example, as a set of target positions of the vehicle 10 at respective times during travel of the vehicle 10 through the trajectory. The vehicle control unit 35 controls components of the vehicle 10 so that the vehicle 10 will travel along the planned trajectory.

The vehicle control unit 35 decelerates the vehicle 10 to the low speed, and controls the vehicle 10 so that the vehicle travels to the target stopping position at the low speed. The vehicle control unit 35 starts decelerating the vehicle 10 and blinking hazard lights. In addition, the vehicle control unit 35 detects objects around the vehicle 10 from each of time-series images obtained by the camera 3. For example, the vehicle control unit 35 may input the image into a classifier to detect objects around the vehicle 10, in a manner similar to that described in relation to the obstacle detection unit 33. Alternatively, in the case where the vehicle 10 includes a distance sensor, such as a LiDAR sensor, the vehicle control unit 35 may detect objects around the vehicle 10, based on a ranging signal obtained by the distance sensor.

The vehicle control unit 35 generates a planned trajectory so that the vehicle 10 will not collide with objects around the vehicle 10. To achieve this, the vehicle control unit 35 tracks objects around the vehicle 10 detected, for example, from time-series images, and estimates predicted trajectories of the respective objects to a predetermined time ahead from the trajectories obtained from the result of tracking. To this end, the vehicle control unit 35 applies a tracking process based on optical flow, such as the Lucas-Kanade method, to an object region representing an object of interest in the latest image obtained by the camera 3 and object regions in past images, thereby tracking the object represented in the object regions. To achieve this, the vehicle control unit 35 applies, for example, a filter for extracting characteristic points, such as SIFT or Harris operator, to the object region of interest, thereby extracting characteristic points from this object region. The vehicle control unit 35 then identifies those points in the object regions in the past images which correspond to the characteristic points in accordance with the applied tracking technique, thereby calculating optical flow. Alternatively, the vehicle control unit 35 may apply another tracking technique applied for tracking a moving object detected from an image to the object region of interest in the latest image and the object regions in the past images, thereby tracking the object represented in the object regions.

For each object being tracked, the vehicle control unit 35 executes viewpoint transformation, using information such as the position at which the camera 3 is mounted on the vehicle 10, thereby transforming the image coordinates of the object into coordinates in an aerial image ("aerial-image coordinates"). To this end, the vehicle control unit 35 can estimate the position of the detected object at acquisition of each image, using the position and orientation of the vehicle 10, an estimated distance to the detected object, and the direction from the vehicle 10 to the object at acquisition of each image. The vehicle control unit 35 estimates the position and orientation of the vehicle 10 in a manner similar to that described in relation to the search unit 32. The vehicle control unit 35 estimates the distance and the direction from the vehicle 10 to the detected object in a manner similar to estimation of the distance to an obstacle by the obstacle detection unit 33. For each object being tracked, the vehicle control unit 35 can estimate the trajectory of the object by arranging the estimated positions in chronological order. The vehicle control unit 35 can then estimate the predicted trajectories of the objects being tracked to a predetermined time ahead by executing a prediction process with, for example, a Kalman filter or a particle filter, based on the trajectories of the objects in a preceding predetermined period.

The vehicle control unit 35 generates a planned trajectory, based on the predicted trajectories of the objects being tracked, so that a predicted distance between the vehicle 10 and each object will not be less than a predetermined distance until the predetermined time ahead and that the lane change to the target stopping position will be completed as necessary.

Upon setting a planned trajectory, the vehicle control unit 35 controls components of the vehicle 10 so that the vehicle 10 will travel along the planned trajectory. For example, the vehicle control unit 35 determines the deceleration of the vehicle 10 according to the planned trajectory and the current speed of the vehicle 10 measured by the vehicle speed sensor (not illustrated), and sets the degree of accelerator opening or the amount of braking so that the deceleration of the vehicle 10 will be equal to the determined deceleration. The vehicle control unit 35 then determines the amount of fuel injection according to the set degree of accelerator opening, and outputs a control signal depending on the amount of fuel injection to a fuel injector of an engine of the vehicle 10. Alternatively, the vehicle control unit 35 determines the electric power to be supplied to a motor according to the set degree of accelerator opening, and controls a driving circuit of the motor so that the determined electric power will be supplied to the motor. The vehicle control unit 35 further outputs a control signal depending on the set amount of braking to the brake of the vehicle 10.

When the direction of the vehicle 10 is changed in order for the vehicle 10 to travel along the planned trajectory, the vehicle control unit 35 determines the steering angle of the vehicle 10 according to the planned trajectory. The vehicle control unit 35 then outputs a control signal depending on the steering angle to an actuator (not illustrated) that controls the steering wheel of the vehicle 10.

The target stopping position may be changed on the way, e.g., in the case where an obstacle is detected in a first or second evacuation space during control of the vehicle 10 toward the evacuation space to stop the vehicle 10 there. In such a case, the vehicle control unit 35 resets the planned trajectory, depending on the changed target stopping position.

Figure 4A:
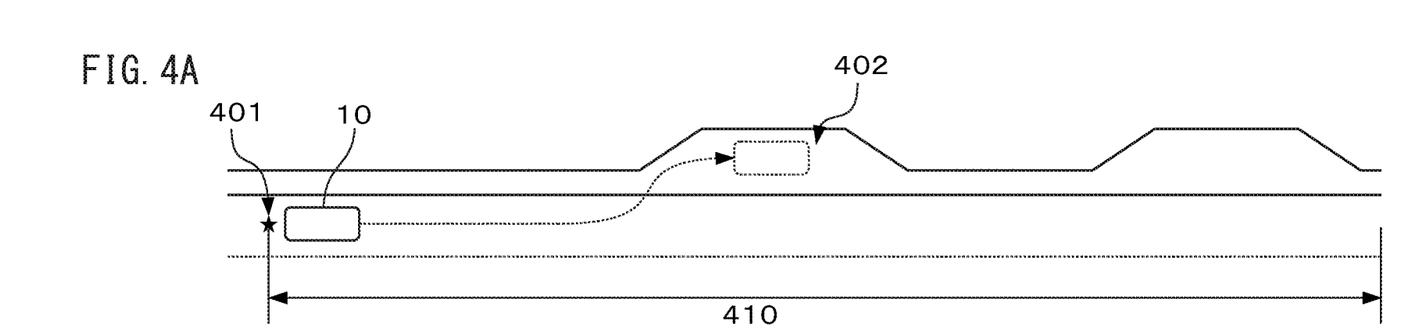
FIG. 4A illustrates a target stopping position of a vehicle in the vehicle control process according to the embodiment.
Figure 4B:
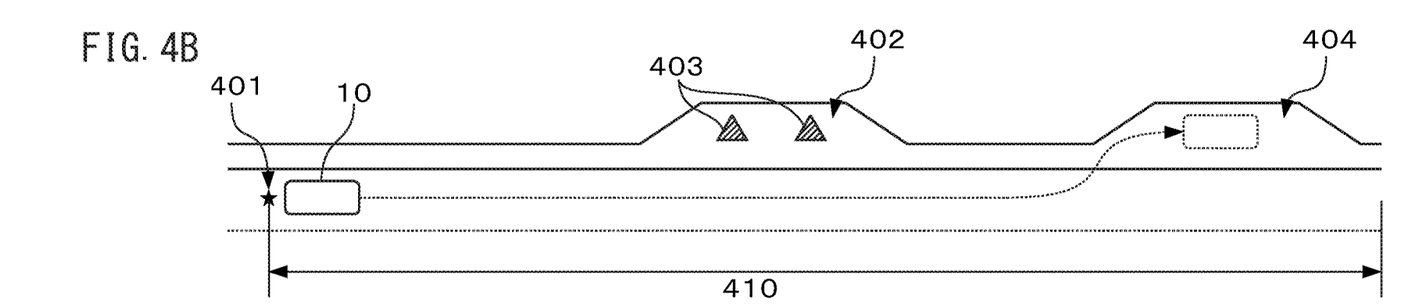
FIG. 4B illustrates a target stopping position of a vehicle in the vehicle control process according to the embodiment.
Figure 4C:
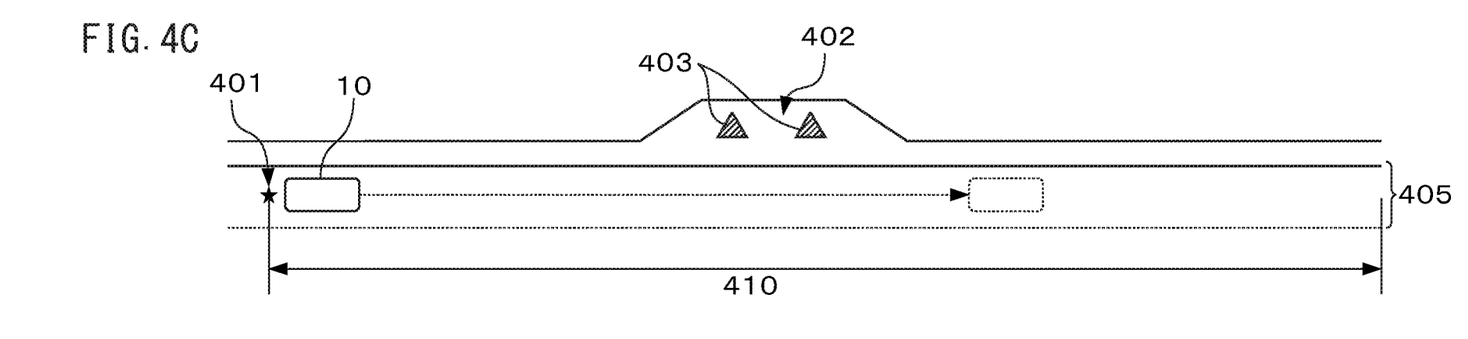
FIG. 4C illustrates a target stopping position of a vehicle in the vehicle control process according to the embodiment.

FIGS. 4A to 4C each illustrate a target stopping position of the vehicle 10 in the vehicle control process according to the present embodiment. In the example illustrated in FIG. 4A, there is a space 402 where the vehicle 10 can stop without obstructing travel of another vehicle, in a section 410 wherein the vehicle 10 travels a predetermined distance from an abnormality detection point 401. Thus the space 402 is set as a first evacuation space. In the example illustrated in FIG. 4A, the first evacuation space 402, where no obstacle exists, is a target stopping position.

In the example illustrated in FIG. 4B, there is a space 402 where the vehicle 10 can stop without obstructing travel of another vehicle, in a section 410 wherein the vehicle 10 travels a predetermined distance from an abnormality detection point 401, as in the example illustrated in FIG. 4A. Thus the space 402 is set as a first evacuation space. However, in this example, there are obstacles 403 in the first evacuation space 402. For this reason, the section 410 is re-searched for a space where the vehicle 10 can stop without obstructing travel of another vehicle. In this example, there is a space 404 where the vehicle 10 can stop without obstructing travel of another vehicle at a position farther from the vehicle 10 than the first evacuation space 402 in the section 410. Thus the space 404 is set as a second evacuation space. The second evacuation space 404 is a target stopping position.

In the example illustrated in FIG. 4C, a first evacuation space 402 is set in a section 410 wherein the vehicle 10 travels a predetermined distance from an abnormality detection point 401, as in the example illustrated in FIG. 4B; however, there are obstacles 403 in the first evacuation space 402. In this example, even if the section 410 is re-searched for a space where the vehicle 10 can stop without obstructing travel of another vehicle, such a space does not exist other than the first evacuation space 402. Thus, at failing to find a second evacuation space, the ECU 6 stops the vehicle 10 on a roadway 405 being traveled by the vehicle 10 before reaching the farthest point of the section 410.

Figure 5:
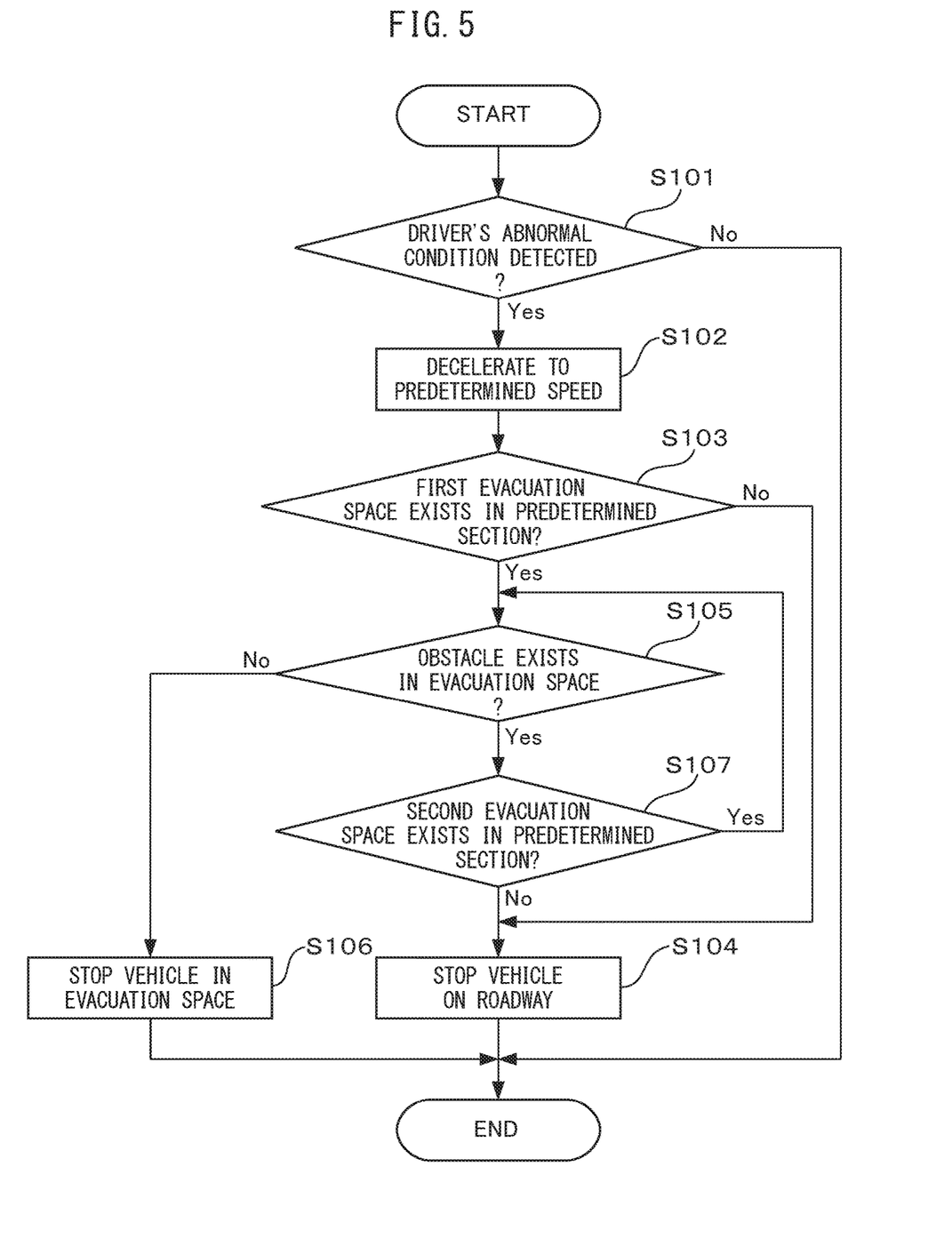
FIG. 5 is an operation flowchart of the vehicle control process.

FIG. 5 is an operation flowchart of the vehicle control process executed by the processor 23. The processor 23 executes the vehicle control process in accordance with this operation flowchart at predetermined intervals, e.g., whenever a head image is obtained.

The abnormality detection unit 31 of the processor 23 determines whether the driver's abnormal condition is detected (step S101). When the driver's abnormal condition is not detected (No in step S101), the processor 23 terminates the vehicle control process.

When the driver's abnormal condition is detected (Yes in step S101), the vehicle control unit 35 of the processor 23 decelerates the vehicle 10 to a predetermined low speed (step S102). The search unit 32 of the processor 23 determines whether there is a first evacuation space where the vehicle 10 can stop without obstructing travel of another vehicle in a predetermined section from the abnormality detection point (step S103). When no first evacuation space is found (No in step S103), the vehicle control unit 35 of the processor 23 controls the vehicle 10 to immediately stop the vehicle 10 on the roadway being traveled by the vehicle 10 (step S104).

When a first evacuation space is detected (Yes in step S103), the obstacle detection unit 33 of the processor 23 determines whether an obstacle is detected in the detected evacuation space (step S105). When no obstacle is detected in the evacuation space (No in step S105), the vehicle control unit 35 starts controlling the vehicle 10 to stop the vehicle 10 in the evacuation space (step S106).

When an obstacle is detected in the evacuation space (Yes in step S105), the re-search unit 34 of the processor 23 re-searches the predetermined section from the abnormality detection point for an evacuation space other than the detected evacuation space. The re-search unit 34 then determines whether there is a second evacuation space where the vehicle 10 can stop without obstructing travel of another vehicle (step S107). When a second evacuation space is detected (Yes in step S107), the processor 23 repeats the processing of step S105 and the subsequent steps.

When no second evacuation space is found (No in step S107), the vehicle control unit 35 starts controlling the vehicle 10 to immediately stop the vehicle 10 on the roadway being traveled (step S104).

After step S104 or S106, the processor 23 terminates the vehicle control process. The processor 23 may execute the processing of step S102 and that of step S103 and the subsequent steps in parallel.

As has been described above, upon detecting the driver's abnormal condition, the vehicle controller searches a predetermined range from the abnormality detection point for a first evacuation space, and controls the vehicle to stop the vehicle in the first evacuation space. However, when there is an obstacle in the first evacuation space, the vehicle controller re-searches the predetermined range from the abnormality detection point for a second evacuation space different from the first evacuation space. The vehicle controller then controls the vehicle to stop the vehicle in the second evacuation space. However, when no second evacuation space is found, the vehicle controller immediately stops the vehicle on the current lane. In this way, the vehicle controller re-searches for an evacuation space even if there is an obstacle in the set evacuation space, enabling increasing the possibility of making an emergency stop of the vehicle outside the roadway when the driver is in an abnormal condition. In addition, since the vehicle controller immediately stops the vehicle when no evacuation space is found at the re-search, the time for stopping the vehicle can be shortened. Thus the vehicle controller can stop the vehicle appropriately when the driver's abnormal condition is detected. Additionally, since the vehicle controller re-searches an evacuation space at a slow speed when an obstacle is detected, the traveled distance before the vehicle is stopped can be reduced even if there is an obstacle in the first evacuation space that is set at the start.

According to a modified example, when an obstacle is detected in a second evacuation space, the re-search unit 34 may omit to re-search for another second evacuation space. In this case, the vehicle control unit 35 may control the vehicle 10 to immediately stop the vehicle on the current lane when notified that an obstacle is detected in the second evacuation space.

According to another modified example, when an obstacle is detected in a first evacuation space, the re-search unit 34 may change the lower limit of the distance between the first and second evacuation spaces, depending on the type of the obstacle. In this case, the obstacle detection unit 33 notifies the re-search unit 34 of the type of the detected obstacle. The re-search unit 34 then sets a lower limit of the distance between the first evacuation space and the second evacuation space for the case where the type of the obstacle is a movable object greater than the lower limit for the case where the type of the obstacle is a stationary object. Examples of the type of obstacle that is a movable object include a human, a motorcycle, and a vehicle. Examples of the type of obstacle that is a stationary object include a pole, a pylon, and a block. The re-search unit 34 searches for a second evacuation space so that the distance between the first and second evacuation spaces is not less than the set lower limit. Further, at re-searching for a second evacuation space, the re-search unit 34 may also set the lower limit of the distance between the previously detected second evacuation space and the re-searched second evacuation space, depending on the type of the obstacle, in the same manner as described above. In this way, the vehicle controller can avoid the situation in which the vehicle 10 cannot stop even in the re-searched evacuation space because an obstacle that is a movable object has moved from the previously detected evacuation space to the re-searched evacuation space.

As described above, those skilled in the art may make various modifications according to embodiments within the scope of the present invention.

What is claimed is:

1. A vehicle controller comprising:
   a processor configured to:
   detect an abnormal condition of a driver of a vehicle, based on an inside sensor signal generated by an inside sensor provided in the interior of the vehicle, the inside sensor signal representing the driver's condition,
   search a predetermined section from the position of the vehicle at detection of the driver's abnormal condition for a first evacuation space where the vehicle can stop without obstructing travel of another vehicle, by referring to map information,
   detect an obstacle in the first evacuation space, based on an outside sensor signal generated by an outside sensor provided on the vehicle, the outside sensor signal representing the surroundings of the vehicle,
   search the section for a second evacuation space where the vehicle can stop without obstructing travel of another vehicle, by referring to the map information, when the obstacle is detected,
   control the vehicle to stop the vehicle in the second evacuation space when the second evacuation space is detected, and
   control the vehicle to stop the vehicle on a roadway being traveled by the vehicle in the section when the second evacuation space is not detected.

2. The vehicle controller according to claim 1, wherein the processor is further configured to decelerate the vehicle to a predetermined speed when the driver's abnormal condition is detected, and
   the processor searches for the second evacuation space while the vehicle is traveling at the predetermined speed.

3. The vehicle controller according to claim 1, wherein the processor is further configured to determine whether the type of the obstacle is a movable object or a stationary object, and
   set a lower limit of the distance between the first evacuation space and the second evacuation space for the case where the type of the obstacle is a movable object greater than the lower limit for the case where the type of the obstacle is a stationary object.

4. A method for vehicle control, comprising:
   detecting an abnormal condition of a driver of a vehicle, based on an inside sensor signal generated by an inside sensor provided in the interior of the vehicle, the inside sensor signal representing the driver's condition;
   searching a predetermined section from the position of the vehicle at detection of the driver's abnormal condition for a first evacuation space where the vehicle can stop without obstructing travel of another vehicle, by referring to map information;

detecting an obstacle in the first evacuation space, based on an outside sensor signal generated by an outside sensor provided on the vehicle, the outside sensor signal representing the surroundings of the vehicle;

searching the section for a second evacuation space where the vehicle can stop without obstructing travel of another vehicle, by referring to the map information, when the obstacle is detected;

controlling the vehicle to stop the vehicle in the second evacuation space when the second evacuation space is detected; and controlling the vehicle to stop the vehicle on a roadway being traveled by the vehicle in the section when the second evacuation space is not detected.

5. A non-transitory recording medium that stores a computer program for vehicle control, the computer program causing a processor mounted on a vehicle to execute a process comprising:

detecting an abnormal condition of a driver of the vehicle, based on an inside sensor signal generated by an inside sensor provided in the interior of the vehicle, the inside sensor signal representing the driver's condition;

searching a predetermined section from the position of the vehicle at detection of the driver's abnormal condition for a first evacuation space where the vehicle can stop without obstructing travel of another vehicle, by referring to map information;

detecting an obstacle in the first evacuation space, based on an outside sensor signal generated by an outside sensor provided on the vehicle, the outside sensor signal representing the surroundings of the vehicle;

searching the section for a second evacuation space where the vehicle can stop without obstructing travel of another vehicle, by referring to the map information, when the obstacle is detected;

controlling the vehicle to stop the vehicle in the second evacuation space when the second evacuation space is detected; and controlling the vehicle to stop the vehicle on a roadway being traveled by the vehicle in the section when the second evacuation space is not detected.

\* \* \* \* \*